Patented Feb. 21, 1950

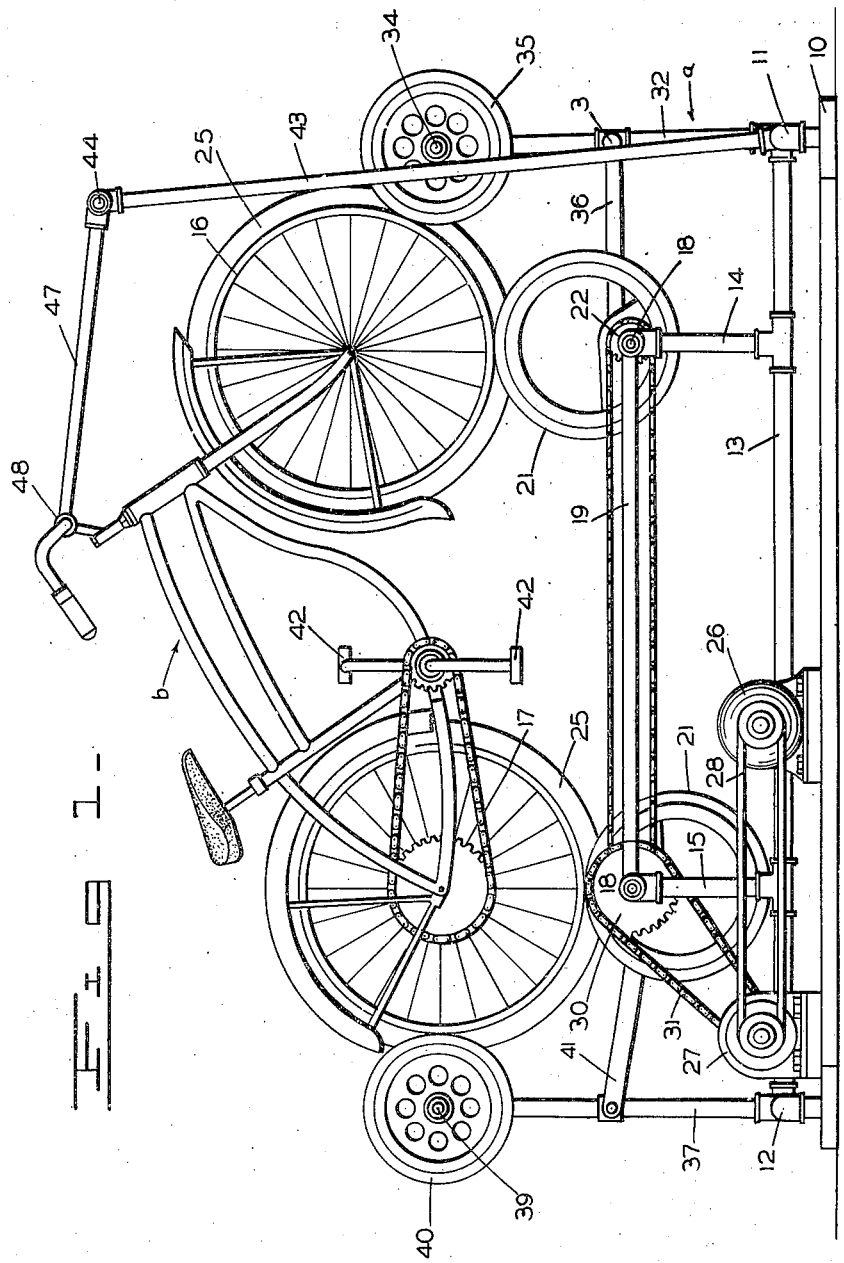

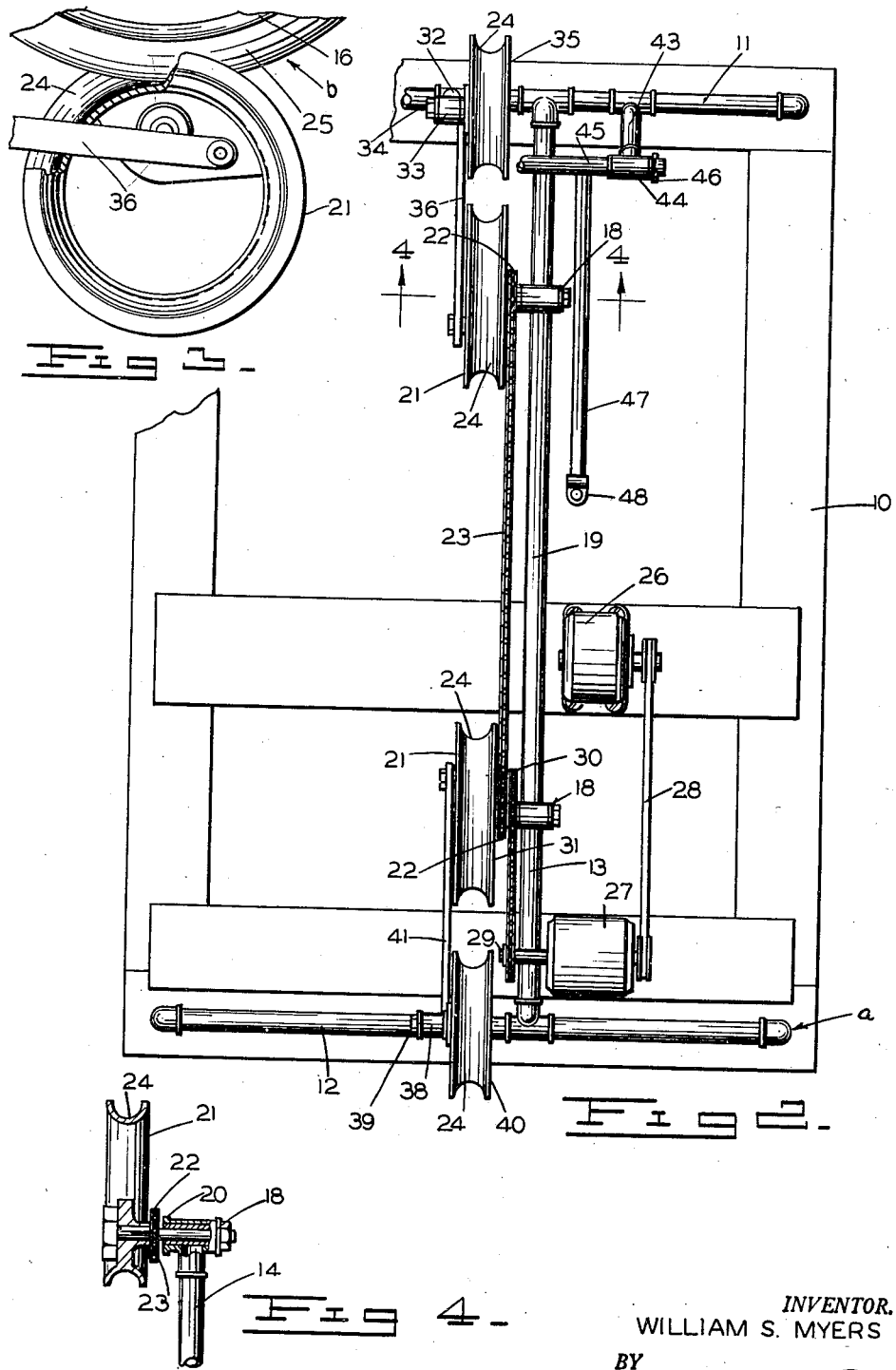

2,498,047

UNITED STATES PATENT OFFICE 2,498,047

EXERCISING APPARATUS TO BE USED WITH BICYCLE

William S. Myers, Ashland, Ky.

Application October 20, 1947, Serial No. 780,782

9 Claims. (Cl. 128—33)

My invention relates to exercising apparatus and more particularly to an exercising apparatus adapted to be used in connection with any standard make bicycle.

The object of my invention is to provide an exercising apparatus of the character indicated above adapted to support a standard bicycle and to impart a swinging up and down movement to said bicycle.

A further object of my invention is to provide an apparatus of the character indicated above equipped with two eccentrically supported rotatable wheels, each of which has a circumferential groove in its rim adapted to receive a portion of a corresponding bicycle tire therein and to engage the same frictionally, so that the bicycle wheel will be rotated, when the eccentric wheel is rotated or vice versa.

Another object of my invention is to provide an apparatus of the character indicated above making possible the in-door use of a bicycle for exercising purposes.

Other objects of my invention not specifically mentioned may appear in the following specification describing my invention with reference to the accompanying drawing illustrating a preferred embodiment of my invention.

It is, however, to be understood that my invention is not to be limited or restricted to the exact construction and combination of parts described in the specification and shown in the drawing, but that such changes and modifications can be made, which fall within the scope of the claims appended hereto.

In the several figures of the drawing similar parts are designated by similar reference characters and Figure 1 is a view in side elevation of an exercising apparatus constructed in accordance with the present invention, showing a bicycle in position.

Figure 2 is a view in top plan of the bicycle supporting frame or of the exercising apparatus with the bicycle removed.

Figure 3 is a detail view partly in side elevation and partly in section of an eccentric wheel.

Figure 4 is a sectional view taken substantially on the line 4—4 of Figure 2.

The exercising apparatus forming the subject matter of my invention comprises a wooden base frame 10, on which a pipe frame $a$ is secured consisting of a transverse front member 11, a rear transverse member 12 and a central longitudinal member 13, connected to the two transverse members by means of conventional pipe fittings.

Two upwardly extending pipe brackets 14 and 15 respectively are secured to the longitudinal central pipe frame member 13 by conventional T pipe fixtures. These pipe brackets 14 and 15 are arranged at a distance from each other equal to the distance between the axes of the front and rear wheels 16 and 17 respectively of a standard bicycle $b$.

On top of each of the two pipe brackets 14 and 15, a ball or roller bearing 18 is securely mounted, so that the axes of these two bearings are located at the same level with each other and extend transversely of the wooden frame 10 and parallel to each other.

A brace pipe 19 extends between the two pipe brackets 14 and 15 and is secured to said brackets adjacent to the upper ends thereof to reinforce and stiffen them.

In each roller bearing 18 a shaft 20 is rotatably but not slidably mounted, so that each shaft extends toward the left beyond the corresponding bearing.

On the left end portion of each shaft 20 an eccentric wheel 21 is rigidly mounted and outside of and adjacent to each eccentric wheel, a sprocket gear 22 is rigidly mounted on each shaft. These two sprocket gears are of the same diameter and have the same number of teeth. A sprocket chain 23 is trained over the two sprocket gears.

The two eccentric wheels 21 are of the same size and each is provided in its rim with a circumferential groove 24 formed so that an inflated bicycle tire 25 fits into said groove. The eccentric wheels 21 are arranged so that the short radius of one of said wheels extends upwardly, when the long radius of the other wheel extends in the same direction.

An electric motor 26 is firmly mounted on a transverse member of the wooden frame 10 located at a distance in front of another transverse member of the same frame. A speed reducing gear transmission unit 27 is secured to the last named wooden frame member. A belt 28 connects the motor 26 with the unit 27 and drives the latter, the last member of which is a comparatively small sprocket gear 29. This gear is located in the same vertical plane with a comparatively large sprocket gear 30 rigidly mounted on the shaft 20 of the rear eccentric wheel 21 and a sprocket chain 31 is trained over the sprocket gears 29 and 30.

On the front transverse pipe frame member 11, a rocker arm 32 is mounted pivotally, on the upper end of which a horizontal bearing 33 is secured.

A shaft 34 is mounted rotatably but not slidably in said bearing and grooved wheel 35 is rigidly mounted on the shaft 34. The groove in this wheel 35 is shaped like the grooves 24 in the eccentric wheels 21.

A connecting rod 36 is pivotally mounted with one of its ends to the front eccentric wheel 21 and with its other end to the rocker arm 32 intermediate the ends of said rocker arm, so that said rocker arm is pivoted forwardly when the forward eccentric wheel is rotated so that the short radius thereof extends upwardly.

On the rear transverse pipe frame member 12, a rear rocker arm 37 is pivotally mounted, on the free end of which a horizontal bearing 38 is secured. A shaft 39 is rotatably but not slidably arranged in said bearing and a grooved wheel 40 is rigidly mounted on this shaft. A connecting rod 41 is pivotally attached with its rear end to the rear rocker arm 37 intermediate the ends thereof and with its front end to the rear eccentric wheel 21, so that the rear rocker arm 37 is pivoted forwardly when the rear eccentric wheel is rotated to place its long radius into upward position.

The four grooved wheels 21, 35 and 40 are located so that the standard bicycle b can be placed on top of the two eccentric wheels 21, the tires 25 engaging the grooves 24 of said eccentric wheels and at the same time being positioned in the grooves of the front grooved wheel 35 and of the rear grooved wheel 40.

When the motor 26 is started and drives the eccentric wheels 21, the wheels 16 and 17 of the bicycle b resting on the eccentric wheels and held in position by the grooved guard wheels 35 and 40 are set in rotary motion by friction and at the same time a swinging alternately lifting and lowering movement is imparted to the front and rear parts of the bicycle. When the front part of the bicycle is raised by the front eccentric wheel 21 the front grooved guard wheel 35 is swung upwardly and rearwardly and is kept thereby in engagement with the front bicycle wheel 16. At the same time the rear eccentric wheel 21 is rotated into position to lower the rear bicycle part and the rear grooved guard wheel 40 is swung downwardly and rearwardly and is kept in engagement with the rear bicycle wheel 17.

If desired the motor 26 and the gear transmission unit 27 may be omitted and the wheels of the bicycle may be set in rotary motion by using the bicycle pedals 42 in the usual manner. The eccentric wheels 21 are then driven by friction and will impart the swinging alternately lifting and lowering movement to the front and rear parts of the bicycle b.

In order to hold the bicycle b in upright position on the grooved eccentric wheels 21, a pair of upright bracket arms 43 is secured to the front transverse pipe frame member 11. On top of each bracket arm 43 a horizontal bearing 44 is firmly secured and a horizontal transverse shaft 45 is rotatably mounted in said bearing.

To prevent accidental sliding movement of said shaft in its bearings cotter pins 46 may be arranged to extend through the shaft outside of the bearings.

The height of the bracket arms 43 is such that the shaft 45 is located approximately at the same level with the handle bar of the bicycle.

A pair of stiffener arms 47 is secured to and extends rearwardly from the shaft 45. The rear ends of the stiffener arms 47 are secured to the handle bar of the bicycle by means of a hinged shackle 48.

Having described my invention I claim as new and desire to secure by Letters Patent:

1. An exercising apparatus of the class described including a pair of wheels eccentrically and rotatably supported on a frame, said wheels being of equal size, each wheel having an annular groove in its rim adapted to frictionally engage the tires of a bicycle arranged in upright position on said eccentric wheels.

2. An apparatus according to claim 1, the eccentric wheels whereof are arranged so that the short radius of one of said wheels always extends in the same direction as the long radius of the other one.

3. An apparatus according to claim 1, including an electric motor adapted to drive one of the eccentric wheels over a speed reducing transmission and a driving coupling between the eccentric wheels.

4. An exercising apparatus of the character described, comprising a pair of wheels eccentrically and rotatably supported on a frame, said wheels being of equal size, each wheel having an annular groove in its rim adapted to frictionally engage the tires of a bicycle arranged in upright position on said eccentric wheels, a front rocker arm pivotally mounted on a front member of the frame, a grooved guard wheel rotatably supported on the top end of the front rocker arm, the groove in the front guard wheel being adapted to frictionally engage the front tire of the bicycle, a rear rocker arm pivotally mounted on a rear member of the frame, a rear grooved guard wheel rotatably arranged on the top end of the rear rocker arm and adapted to frictionally engage the rear tire of the bicycle, a front connecting rod pivotally secured to the front rocker arm intermediate its ends and to the front eccentric wheel so that the front guard wheel is swung forwardly and downwardly when the short radius of the front eccentric wheel is rotated to extend upwardly, and another connecting rod pivotally connected to the rear rocker arm and the rear eccentric wheel so that the rear guard wheel is swung upwardly and forwardly, when the long radius of the rear eccentric wheel is rotated to extend upwardly.

5. An apparatus according to claim 1, including a pair of stiffener arms pivotally connected to an upright bracket frame, and a shackle on each stiffener arm adapted to be hingedly secured to the handle bar of the bicycle.

6. Exercising apparatus of the character described for use with a bicycle, comprising a pair of rotatably mounted wheels each having a peripheral groove to receive a bicycle tire, means for rotating said wheels in unison, a pair of rotatably supported guard wheels positioned for peripheral contact with the wheels of a bicycle supported on the first wheels and at an elevation above the first wheels, means for effecting the raising and lowering of the bicycle wheels while the same are rotating, means carrying the guard wheels for swinging movement in a vertical plane, and means for effecting the swinging of the guard wheel carrying means in time with the raising and lowering of the bicycle wheels.

7. Exercising apparatus of the character stated in claim 6, wherein the said means for effecting the swinging of the guard wheel carrying means comprises a connecting rod between each of the guard wheel carrying means and one of the first wheels, said connecting rods being eccentrically coupled with the first wheels.

8. Exercising apparatus for use with a bicycle, comprising a pair of bearings supported at the same elevation above an underlying supporting structure, a pair of peripherally grooved wheels, means eccentrically rotatably supporting each wheel in one of said bearings, the wheels being positioned to rotate on parallel axes, the rotational centers of said wheels being spaced apart a distance approximately equal to the distance between the axles of wheels of a bicycle, the peripheral grooves of the first mentioned wheels being adapted to receive the tires of the wheels of a bicycle, a pair of upright standards spaced apart a distance greater than the spacing of the first mentioned wheels, said standards being supported for rocking movement in a common vertical plane, a guard wheel carried by each of said standards and adapted to have peripheral contact with a bicycle wheel supported upon the adjacent peripherally grooved wheel, and means for effecting the rocking of said standards in synchronism with the rise and fall of said eccentrically mounted peripherally grooved wheels.

9. Exercising apparatus of the character stated in claim 8, wherein the said means for effecting the rocking of the standards comprises a connecting rod connected with each standard and having an eccentric connection with the adjacent peripherally grooved wheel.

WILLIAM S. MYERS.

REFERENCES CITED

The following references are of record in the file of this patent:

UNITED STATES PATENTS

| Number | Name | Date |
|---|---|---|
| 560,061 | Fox | May 12, 1896 |
| 1,791,777 | Webb | Feb. 10, 1931 |